April 22, 1930.  M. B. WILLIAMS  1,755,623

AUTOMATIC TRACTOR STEERING DEVICE

Filed Oct. 4, 1928  2 Sheets-Sheet 2

Inventor
M. B. Williams
By Watson E. Coleman
Attorney

Patented Apr. 22, 1930

1,755,623

UNITED STATES PATENT OFFICE

MARK B. WILLIAMS, OF PLAINVIEW, TEXAS

AUTOMATIC TRACTOR STEERING DEVICE

Application filed October 4, 1928. Serial No. 310,326.

This invention relates to an automatic steering device for tractors, the primary object of the invention being to so control tractor operating plows of the disk or harrow type that after the formation of the first furrow, the tractor can be left unattended to continue the plowing operation, the steering controlling device operating in the previously formed furrow to guide the tractor in the formation of the succeeding furrow.

Another object of the invention is to provide an automatic steering controlling means for tractor plows designed to turn the tractor about sharp corners or substantially right angular turns.

Still another object of the invention is to provide an automatic steering device for tractor plows in which the operation of the tractor will be stopped in the event that the steering device leaves the furrow in which it is travelling.

The invention further aims to provide an automatic steering device of the above described character which is of simple but strong and durable construction, unfailing in operation, comparatively simple to construct and easily attached to a tractor.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 4 is a sectional view taken substantially upon the line 4—4 of Figure 1.

Figure 1:
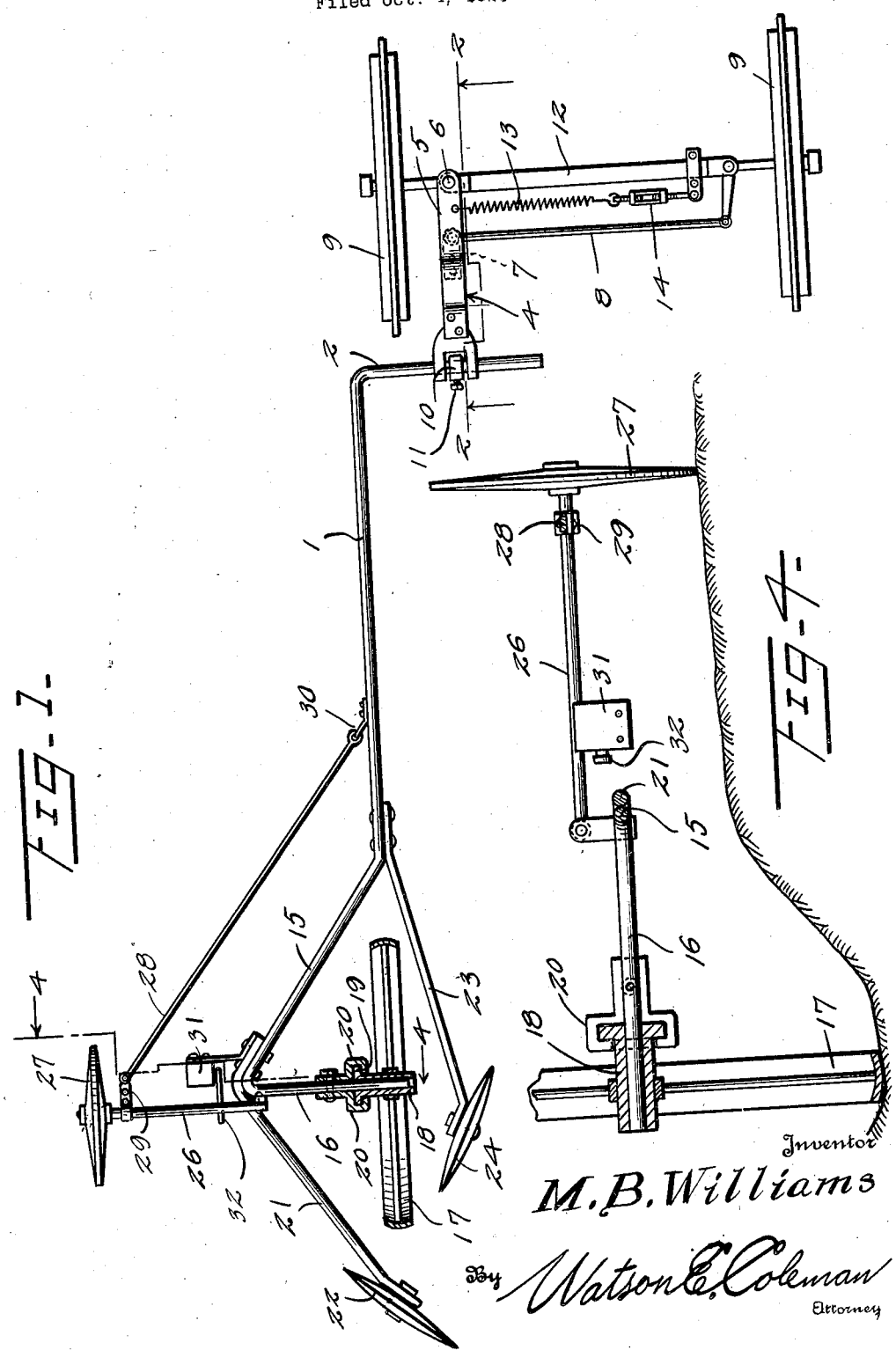
Figure 1 is a view partly in top plan and partly in horizontal section of the tractor steering mechanism control device embodying this invention.
Figure 2:
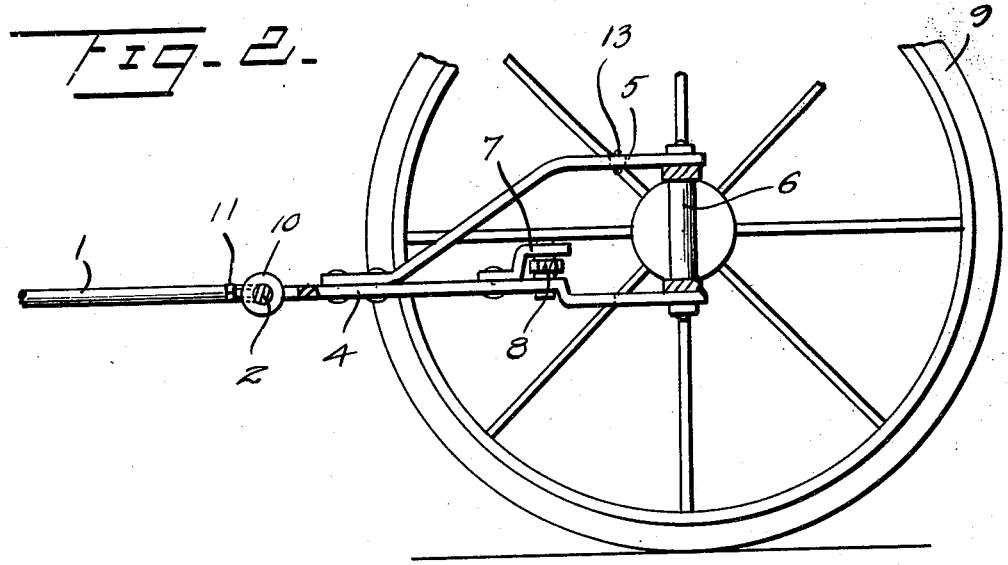
Figure 2 is a sectional view taken substantially upon the line 2—2 of Figure 1.
Figure 3:
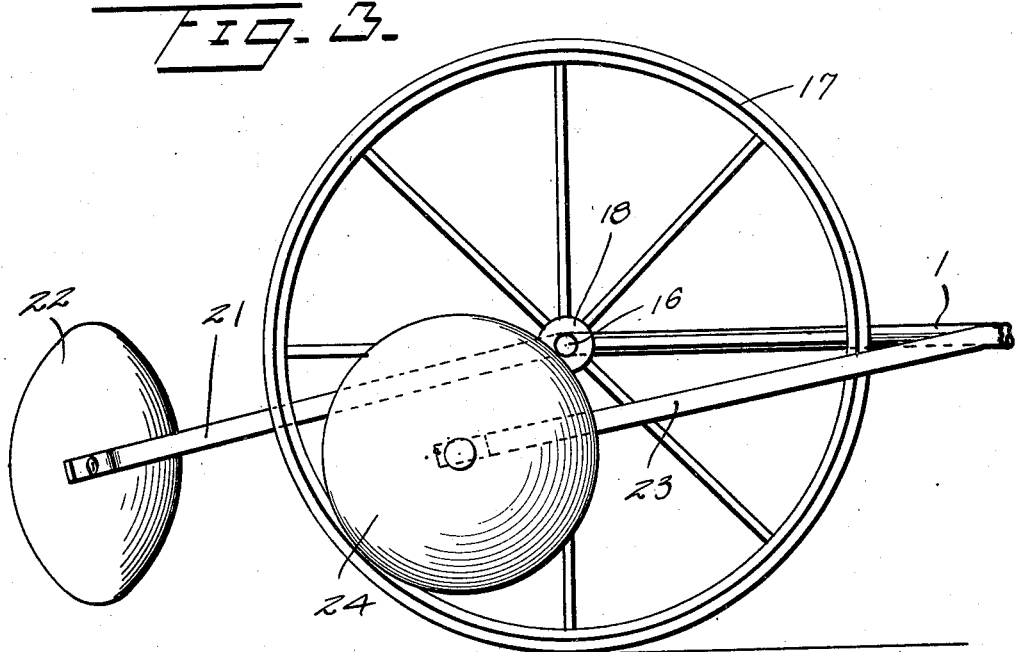
Figure 3 is a side elevational view of the lead wheel of the steering mechanism and the disks associated therewith.

Referring to the drawings in detail wherein like numerals of reference indicate corresponding parts throughout the several views, the numeral 1 indicates a main guide arm, one end of which is turned at right angles as indicated at 2 to extend through the spaced alined bearings 3 of a bifurcated supporting bracket 4.

The furcations 5 of this bracket are arranged in vertically spaced relation so that the upper furcations will engage over the upper end of a spindle pin 6 of a tractor steering mechanism while the lower furcation engages over the lower end of this pin, suitable securing devices being used to maintain the ends of the furcations in engagement with the pin. The lower one of the furcations 5 carries upon its upper side a bracket 7 between which bracket and the supporting furcation one end of the tie rod 8 connecting the stub shafts of the front wheels 9 of the tractor, is pivotally engaged. The angular portion 2 of the main guide arm has a collar 10 secured thereto by the set screw 11, this collar acting to hold the rod in adjusted position in the bearings 3.

The bracket 4 is connected to a fixed portion of the tractor such as the axle 12 by a spring 13, connection between the spring and the axle at a point remote from the end where the bracket 4 is positioned, being made through the medium of a turn buckle 14. The spring 13 operates to normally pull the bracket 4 inwardly so that the supporting guide wheel hereinafter described, carried at the forward end of the arm 1, is normally pulled toward the inner side of a furrow in which it is operating.

Lateral adjustment of the angular portion 2 of the arm 1 is made so that the arm will extend forwardly of the tractor in a line outside of the adjacent guide wheel 9. The outer end of the arm 1 is directed outwardly and forwardly at an oblique angle as indicated at 15 and this obliquely angled portion terminates in a return portion 16 which constitutes a stub axle for the guide wheel 17.

As shown this stub axle or portion 16 is arranged at substantially right angles to the main portion of the arm 1 and terminates at a point where the wheel 17 will be held in alinement with the guide arm. The hub 18 of the guide wheel may be provided with a flange 19 at that end where the stub axle 16 enters, suitable semi-circular guide casings 20 being secured to the stub axle and engaging over this flange to make a dust tight bearing connection and at the same time acting to hold the wheel on the stub axle.

The obliquely directed portion 15 of the arm 1 has secured thereto at its forward end the forwardly extending auxiliary arm 21 upon the forward end of which is pivotally mounted a stub disk 22, this arm 21 being so angled with relation to the supporting portion 15 of the main arm, as to position the disk 22 directly forwardly of the guide wheel 17. This stub disk 22 operates to cause the arm 1 to swing laterally of the path of travel of the tractor when a turn in the furrow in which the guide wheel 17 is moving is reached by abutting the outer wall of the furrow and riding thereagainst until the guide wheel swings around the angle, thus causing the tractor to make a turn corresponding to the angle in the furrow. The height of the auxiliary arm 21 is normally such as to maintain the disk 22 from contact with the ground, except when a turn in the furrow is reached as just described or when the guide wheel rides up upon one side of the furrow, at which time it comes into contact with the furrow wall.

On the inner side of the guide arm 1 there is secured to the guide arm a second auxiliary forwardly extending arm 23, this arm carrying upon its forward end and adjacent the inner side of the guide wheel 17, a disk 24, which while normally supported free from contact with the ground acts in the event that the guide wheel 17 moves inwardly or begins to ride up upon the inner wall of the furrow, to push the guide wheel back to position by contacting with the inner wall.

Pivotally attached at one end to a suitable bracket 25 mounted upon the stub shaft 16, is a vertically shiftable outwardly directed lever 26, the outer end of which pivotally supports a switch control wheel 27, this wheel being arranged to travel when in contact with the ground in a path substantially parallel with the path of travel of the guide wheel 17. The outer end of the lever 26 is normally maintained in its proper position by a brace 28, one end of which is connected thereto as indicated at 29 while the other end is secured by a suitable bracket or in any other suitable manner to the arm 1, as indicated at 30.

Mounted upon the oblique portion 15 of the arm 1 is an electric switch 31 of any suitable character designed to be operated by a swinging arm 32, this arm extending forwardly beneath the arm 26 in the manner shown. This switch 31 is suitably connected with the ignition circuit of the tractor to which the device is attached and is so adjusted that when the arm 32 thereof is pushed downwardly, it will operate to short circuit the tractor ignition system and stop the operation of the tractor.

The structure including the arm 26, wheel 27, switch and arm 31 and 32 comprises a safety element for the tractor in the event that the guide wheel 17 rides up one side of the furrow in which it is travelling and escapes therefrom. When this occurs the guide arm 1 will, of course, be lifted at its forward end and the switch wheel 27 will drop, bringing its supporting arm or lever 26 down upon the lever 32 of the switch 31 operating the switch to short circuit the ignition system of the tractor, thus interrupting the operation of the same.

From the foregoing description, it will be appreciated that the structure set forth can be employed to take complete control of the tractor during the plowing operation for it will be seen that under normal conditions the disks 22 and 24 will operate to hold the guide wheel 17 in the guiding furrow, the disk 22 will in addition operate to swing the guide arm about a turn in a furrow, to cause the corresponding turning action through the medium of the arm 1 of the steering mechanism of the tractor and in the event that the guide wheel 17 does escape from the guide furrow in which it is travelling the wheel 27 and its supporting arm will drop to operate the switch 32 in the manner previously described to halt the tractor, thus preventing the same from running wild and causing possible damage to itself or surrounding property.

Having thus described my invention, what I claim is:—

1. An automatic steering mechanism control for tractor plows comprising a main guide arm designed to be connected to a tractor steering mechanism, a furrow following element supported by and at the forward end of the guide arm, and means carried by the arm forwardly of the element for taking control of the same at a furrow turn to swing the arm about the turn.

2. A steering mechanism control for tractor plows comprising a guide arm, means for connecting said guide arm at one end to a tractor steering mechanism to extend forwardly of the tractor, a furrow following element carried by the arm, and auxiliary control elements associated with said furrow following element acting to maintain the first-mentioned element in the center of the furrow, one of said auxiliary elements further operating at a turn in the furrow to swing the arm about the turn.

3. In a steering mechanism control for tractor plows a main guide arm designed to project forwardly of a tractor, means for connecting the arm to the tractor steering mechanism to control the same, a furrow following element carried by the arm, and means operating upon the displacement of the element from the furrow to stop the operation of the tractor.

4. A steering mechanism control for motor operated plows having a steering mechanism comprising a swinging bracket designed to be coupled with said steering mechanism, an arm carried by the bracket to extend forwardly of the mechanism, a furrow following wheel carried by the arm, and a pair of disk members carried by the arm and normally free from contact with the ground designed to engage the sides of the furrow under certain conditions to maintain the wheel in position therein.

5. A steering mechanism control for motor operated plows having a steering mechanism comprising a swinging bracket designed to be coupled with said steering mechanism, an arm carried by the bracket to extend forwardly of the mechanism, a furrow following wheel carried by the arm, and a pair of disk members carried by the arm and normally free from contact with the ground designed to engage the sides of the furrow under certain conditions to maintain the wheel in position therein, one of said disk members being arranged forwardly of said wheel and at an angle to the direction of travel thereof to abut the side of the furrow at a turn to cause the arm to swing about the turn.

6. A steering mechanism control for motor operated plows having a steering mechanism comprising a swinging bracket designed to be coupled with said steering mechanism, an arm carried by the bracket to extend forwardly of the mechanism, a furrow following wheel carried by the arm, a pair of disk members carried by the arm and normally free from contact with the ground designed to engage the sides of the furrow under certain conditions to maintain the wheel in position therein, and means carried by the arm designed to operate upon the movement of said wheel up one side of the furrow to stop the operation of the motor operated plow.

7. An automatic control for the steering mechanism of a tractor plow having the usual stub shaft spindles and tie rod connecting the stub shafts, comprising a bracket designed to be secured to one of said spindles, means for connecting one end of the tie rod to the bracket, a main guide arm having a lateral extension at one end pivotally secured to said bracket, a furrow following wheel carried at the other end of said arm, a pair of auxiliary arms carried by the guide arm, and a disk member carried by each auxiliary arm, one of said auxiliary arms extending to a point beyond the guide wheel and supporting a disk forwardly thereof at an oblique angle with respect to the path of travel of the tractor.

8. An automatic control for the steering mechanism of a tractor plow having the usual stub shaft spindles and tie rod connecting the stub shafts, comprising a bracket designed to be secured to one of said spindles, means for connecting one end of the tie rod to the bracket, a main guide arm having a lateral extension at one end pivotally secured to said bracket, a furrow following wheel carried at the other end of said arm, a pair of auxiliary arms carried by the guide arm, a disk member carried by each auxiliary arm, said disks being designed to engage the sides of a furrow to maintain the guide wheel in position therein, and a laterally extending arm pivotally connected at one end to said guide arm, a wheel supported at the opposite end of said pivoted arm, and a switch mechanism designed to be operated by the downward movement of said pivoted arm upon the raising of said guide wheel, to short circuit an ignition system of the tractor.

9. A steering mechanism control for tractor plows, comprising a guide arm, means for connecting said guide arm at one end to a tractor steering mechanism to extend forwardly of the tractor, a furrow following element carried by the arm, and means carried by the arm forwardly and at one side of said element for maintaining the element in the center of the row.

In testimony whereof I hereunto affix my signature.

MARK B. WILLIAMS.